(12) United States Patent
Lee

(10) Patent No.: US 8,284,077 B2
(45) Date of Patent: Oct. 9, 2012

(54) ION-DIELECTRIC TOUCH SENSOR AND DEVICE USING SAME

(76) Inventor: Chun-Yuan Lee, Zhudong Township, Hsinchu County (TW)

( * ) Notice: Subject to any disclaimer, the term of this patent is extended or adjusted under 35 U.S.C. 154(b) by 504 days.

(21) Appl. No.: 12/654,001

(22) Filed: Dec. 8, 2009

(65) Prior Publication Data

US 2010/0148993 A1     Jun. 17, 2010

(30) Foreign Application Priority Data

Dec. 12, 2008  (TW) ................ 97148524 A

(51) Int. Cl.
*H03M 11/00*   (2006.01)
*G06F 3/041*   (2006.01)
(52) U.S. Cl. ............... 341/20; 341/33; 345/174
(58) Field of Classification Search ........... 341/20, 341/33; 345/173, 174
See application file for complete search history.

(56) References Cited

U.S. PATENT DOCUMENTS

| 7,724,243 | B2 * | 5/2010 | Geaghan ............ 345/173 |
| 8,031,180 | B2 * | 10/2011 | Miyamoto et al. ......... 345/173 |
| 2003/0213624 | A1 * | 11/2003 | Cross et al. ............. 178/18.06 |
| 2006/0132462 | A1 * | 6/2006 | Geaghan ............ 345/173 |

* cited by examiner

*Primary Examiner* — Howard Williams
*(74) Attorney, Agent, or Firm* — Rosenberg, Klein & Lee

(57) ABSTRACT

An ion-dielectric touch sensor detects a touching operation applied by a touching object thereto. The ion-dielectric touch sensor includes a base board, a first electrode, a second electrode, and a dielectric layer. The base board forms an electrode mounting surface on which the first and second electrodes are arranged in such a way that the second electrode is closed to but spaced from the first electrode. The dielectric layer is coated on the electrode mounting surface of the base board and encloses the first and second electrodes. When the touching object touches the dielectric layer of the ion-dielectric touch sensor, a variation of the electrical resistance between the first and second electrodes is caused. The variation of electrical resistance is detected by a detection circuit connected between the first and second electrodes.

7 Claims, 3 Drawing Sheets

ION-DIELECTRIC TOUCH SENSOR AND DEVICE USING SAME

FIELD OF THE INVENTION

The present invention relates to a sensor and a device using the sensor, and in particular to an ion-dielectric touch sensor and a device using the sensor.

BACKGROUND OF THE INVENTION

A touch sensor is a detecting element or system. Direct contact between the touch sensor and an object to be detected induces a physical effect by which the condition of contact and physical properties on the surface of the object to be detected can be identified. The touch sensor shows a very wide range of application. For example, a single touch sensor can serve as a switch, and a two-dimensional touch sensor may provide a tactile image. In an example of application in robots, the touch sensor can be used to control the movement of the robots, such as gripping an object, and is a necessary sensor for motion control. In an example of application in computer field, the touch sensor, when combined with a display, provides a touch controlled input device, which is often referred to as a touch panel, and is widely applied in electronic products of household, communication, and information appliances, such as serving as input interfaces for widely used commercial products of personal digital assistants (PDA's), various household electrical appliances, and game machines. Through combination of the touch sensor and a display, an input interface allows a user to use a finger or a stylus to do selection and input of instruction, according to the image displayed on the display, to the for example PDA's, various household electrical appliances, and game machines, and this use can be further expanded to public information consultation devices, to provide an operation system that improves convenience of use for the public.

The touch sensor has two major types, namely digital touch sensor and analog touch sensor. The digital touch sensor has a touch surface that is divided into a plurality of discrete portions, each of which generates a signal upon touched. Consequently, detection resolution of the digital touch sensor is limited to only recognize the specific discrete portions where a finger or a stylus touches. On the contrary, the analog touch sensor provides a non-discrete signal and thus the detection resolution is only restricted by the overall sensitivity of the analog touch sensor and an electronic circuit that provides control of the touch sensor.

Further, the digital touch sensor and the analog touch sensor are alternatively classified as resistive touch sensor, capacitive touch sensor, sound wave touch sensor, and optic touch sensor. Touch detection techniques that are most commonly used in the touch sensor are resistive touch sensing and capacitive touch sensing.

The capacitive touch sensor comprises a resistive coating layer directly deposited on a solid-state insulation substrate. The insulation substrate is often made of glass and has corners on which electrodes are mounted to establish an electric field. A controller is connected to all electrodes to monitor the electrical current flowing through the electrodes. When a human finger or a touching object forms capacitive coupling with the electrodes, the coupling induces a small current flowing the resistive coating layer and each electrode. Through capacitive coupling between human body and grounding, a path allowing the current to return to the controller is formed. The controller may then determine the coordination of the location of touch according to the current flowing through the electrodes.

The resistive touch sensor comprises a flexible film arranged above a substrate. The flexible film and the substrate are coated with transparent conductive layers and a plurality of insulation spacers are set between the flexible film and the substrate. When an operator touches the flexible film, the flexible film is caused to contact the transparent conductive layer of the substrate, whereby the touching operation causes a current flowing between the film and the substrate. A controller is provided to compare current flows induced in various electrodes or buses printed on each conductive surface in order to determine the location of contact between the film and the substrate.

SUMMARY OF THE INVENTION

However, the conventional resistive touch sensor does not have sufficient mechanical strength and is susceptible to breaking, and may easily cause electrical shocks to users. Further, the conventional resistive touch sensor has poor interface stability, leading to problems of incorrect detection of location and excessive detection, errors. In addition, the conventional device also suffers short lifespan, poor conductivity in room temperature, and unstable interface between film and electrode.

Thus, an object of the present invention aims to provide an ion-dielectric touch sensor, which improves the drawback of fault detection caused by instability of conductive interface of the conventional touch sensors.

Another object of the present invention is to provide an ion-dielectric touch sensor, which provides an application to an electronic device by being combined with the electronic device.

The technical solution that the present invention adopts to overcome the above discussed problems is an ion-dielectric touch sensor, which detects a touching operation of a touching object applied to the ion-dielectric touch sensor. The ion-dielectric touch sensor comprises a base board, a first electrode, a second electrode, and a dielectric layer. The base board forms an electrode mounting surface on which the first and second electrodes are arranged in such a way that the second electrode is close to but spaced from the first electrode. The dielectric layer is coated on the electrode mounting surface of the base board and encloses the first and second electrodes.

When the touching object touches the dielectric layer of the ion-dielectric touch sensor, a variation of the electrical resistance between the first and second electrodes is caused. The variation of electrical resistance is detected by a detection circuit connected between the first and second electrodes.

With the technical solution adopted in the present invention, the dielectric layer of the ion-dielectric touch sensor comprises at least one polymer electrolyte. The polymer electrolyte exhibits the advantages of low hysteresis, high ion conductivity, and low resistance. The polymer electrolyte is also advantageous in thermal stability and size stability and is more resistant against reversed voltage. Thus, potential risk of explosion of the ion-dielectric touch sensor due to improper use, such as over-voltage, can be eliminated and operation safety is enhanced.

Since the transfer of ions occurs in the amorphous regions of the polymer, the method of forming the dielectric material provided by the present invention can effectively improve the mechanical strength and interface stability of the dielectric layer of the touch sensor, realizing the optimum electrical conduction mechanism and arrangement. Compared to the known touch sensors, the present invention effectively improves the problems of fault detection and poor conductivity of the conventional devices.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
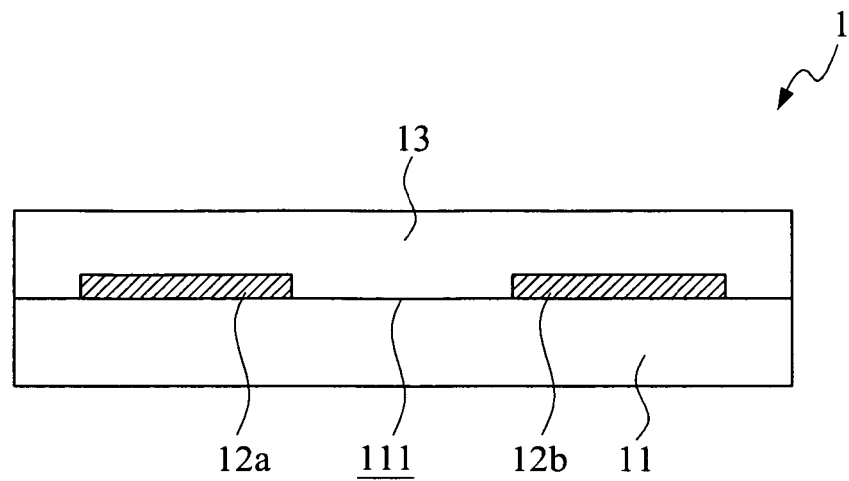
FIG. 1 shows a schematic view of a first embodiment in accordance with the present invention.

With reference to the drawings and in particular to FIG. 1, which shows a schematic view of a first embodiment in accordance with the present invention, the first embodiment of the present invention provides an ion-dielectric touch sensor, which is generally designated at 1, comprising a base board 11, a first electrode 12a, a second electrode 12b, and a dielectric layer 13. The base board 11 of the ion-dielectric touch sensor 1 forms an electrode mounting surface 111. The first electrode 12a and the second electrode 12b are arranged on the electrode mounting surface 111 of the base board 11 in such a way that the second electrode 12b is close to (adjacent to but spaced from) the first electrode 12a. As shown in the drawing, the dielectric layer 13 of the ion-dielectric touch sensor 1 is laid on the electrode mounting surface 111 of the base board 11 and encloses the first electrode 12a and the second electrode 12b.

The dielectric layer 13 of the base board 11 is formed of at least one polymer electrolyte. It is generally known that a polymer electrolyte allows for transfer of positive and negative ions between positive and negative electrodes. The positive ions applicable in the present invention may comprise hydrogen ion ($H^+$), ammonium ion ($NR_4^+$), ions of Groups IA, IIA of the periodic table of the chemical elements, such as lithium ion ($Li^+$), sodium ion ($Na^+$), potassium ion ($K^+$), magnesium ion ($Mg^{2+}$), and calcium ion ($Ca^{2+}$), ions of Group B of the periodic table of the chemical elements, such as copper ion ($Cu^{2+}$), nickel ion ($Ni^{2+}$), and zinc ion ($Zn^{2+}$), and the negative ions that can be used in the present invention may comprise ions of Group VIIA of the periodic table of the chemical elements, such as fluorine ion ($F^-$), chlorine ion ($Cl^-$), bromine ion ($Br^-$), and iodine ion ($I^-$), boron tetrafluoride ($BF_4^-$), phosphorus hexafluoride ($PF_6^-$), nitrate ion ($NO_3^-$), and sulfate ion ($SO_4^{2-}$). The polymer may further contain functional groups of positive or negative ions, such as sulfonyl group, carboxyl group, and ammonium group. To reduce errors occurring in the transmission of signal, the polymer electrolyte must be of particular characteristics of high ion conductivity, low electron conductivity, and high chemical stability. Since the positive and negative ions are moved along paths extending through amorphous regions of the polymer for electrical conduction and transmission of signal, to reduce crystallizability of the polymer electrolyte, in accordance with the present invention, the dielectric layer 13 of the ion-dielectric touch sensor 1 is formed of a dielectric material containing an organic polymer, and the dielectric layer 13 is formed of a mixture of the organic polymer and the polymer electrolyte. Alternatively, the dielectric material may contain silicon polymer and the dielectric layer 13 is formed of a mixture of the silicon polymer and the polymer electrolyte. Further alternatively, the dielectric material may contain a plurality of monomers that are polymerized to form a co-polymer, which is used to form the dielectric layer 13. Or alternatively, the dielectric layer 13 may further comprise an adhesive material, and the dielectric layer 13 is formed of a mixture of the adhesive material and the polymer electrolyte.

It is clear that the above discussed methods are only some of the methods that can be used to form the dielectric layer and whatever method or composition that satisfy the features of the present invention is considered within the scope of the present invention. Those having ordinary skills in the art may adopt other synthetic materials or whatever materials to achieve this object and this will not be further discussed.

Figure 2:
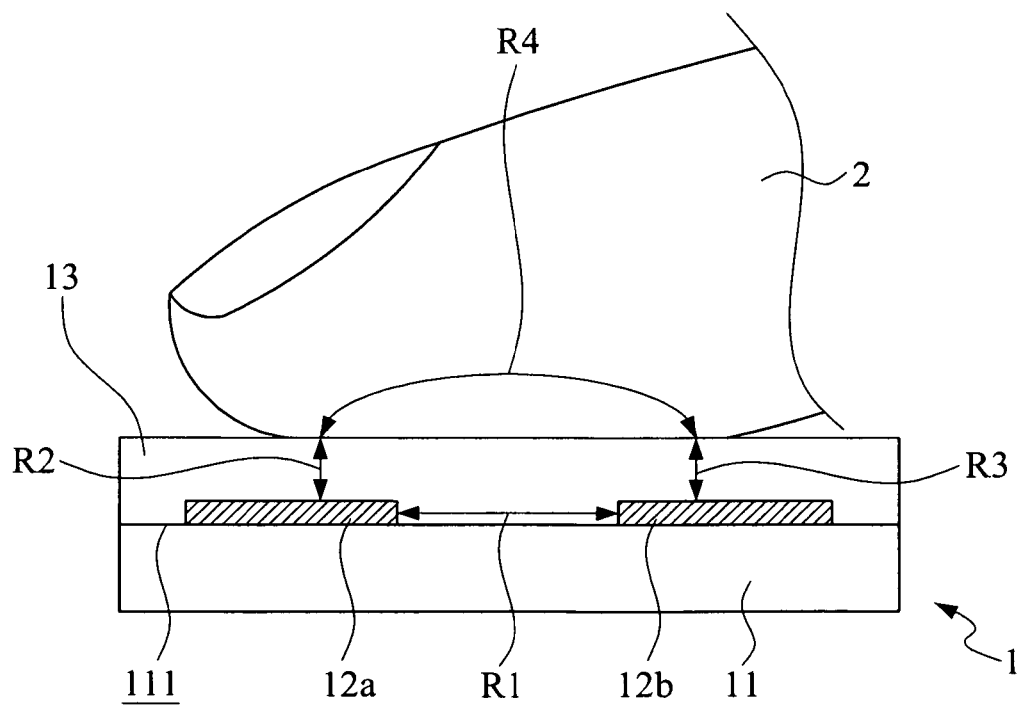
FIG. 2 is a schematic view illustrating a finger touching the ion-dielectric touch sensor in accordance with the first embodiment of the present invention.
Figure 3:
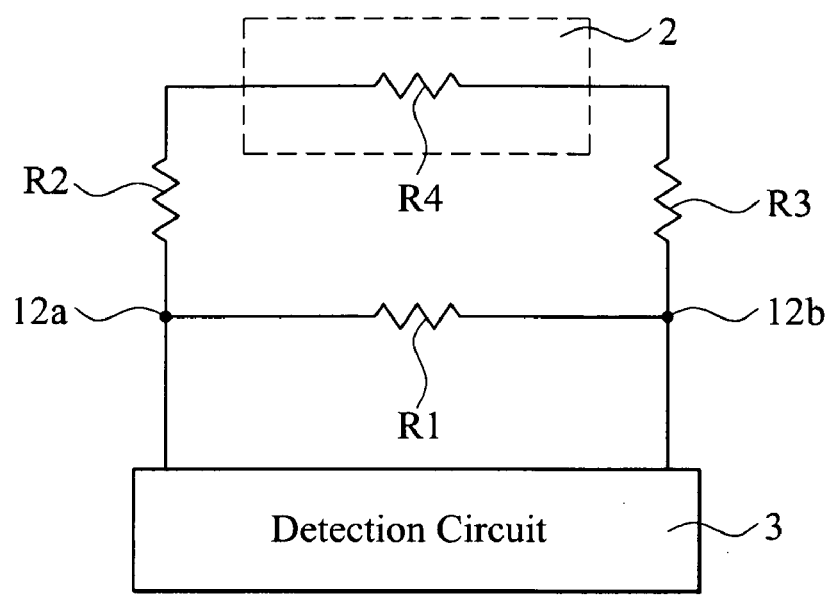
FIG. 3 is a circuit diagram showing an equivalent circuit of FIG. 2.

Referring to FIGS. 2 and 3, FIG. 2 is a schematic view illustrating a finger touching the ion-dielectric touch sensor in accordance with the first embodiment of the present invention, and FIG. 3 is a circuit diagram showing an equivalent circuit of FIG. 2. The dielectric layer 13, the first electrode 12a, the second electrode 12b, and a touching object 2 are considered respectively comprising a resistor R1, R2, R3, and R4. As shown in FIG. 3, the resistors R2, R3, R4 show a connection relationship of being in serial connection, whereby an equivalent resistance, designated by R, between the first electrode 12a and the second electrode 12b can be formulated in terms of the four resistors R1-R4, as follows:

$$R=R1(R2+R3+R4)/[R1+(R2+R3+R4)]$$

In other words, the equivalent resistance is that resistors R2, R3, R4 are connected in serial and then connected to the resistor R1 in parallel.

When the touching object 2 is put into contact with the dielectric layer 13 of the ion-dielectric touch sensor 1, the equivalent resistance between the first electrode 12a and the second electrode 12b changes the value thereof and the variation of the equivalent resistance is detected by a detection circuit 3 connected between the first electrode 12a and the second electrode 12b.

For a touching object 2 formed of an electrical conductor, such as a human finger in the embodiment illustrated, the touching object 2 shows a resistance R4. It is obvious that the touching object 2 can be formed of other articles, such as a metallic conductor, a water droplet, or an article containing water. Since a metallic conductor shows an electrical resistance that is close to zero, when the touching object 2 is formed of a metallic conductor and is put in contact with the dielectric layer 13 of the ion-dielectric touch sensor 1, the resistance R4 of the touching object 2 can be simply neglected. In other words, the equivalent resistance between the first electrode 12a and the second electrode 12b in terms of the resistors R1-R4 becomes as follows:

$$R=R1(R2+R3)/[R1+(R2+R3)]$$

In other words, the equivalent resistance is that resistors R2, R3, are connected in serial and then connected to the resistor R1 in parallel.

Figure 4:
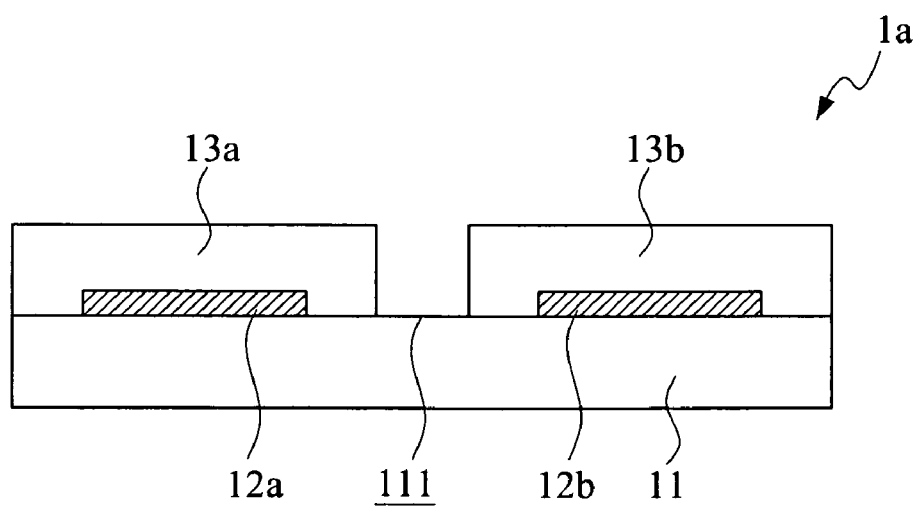
FIG. 4 shows a schematic view of a second embodiment in accordance with the present invention.
Figure 5:
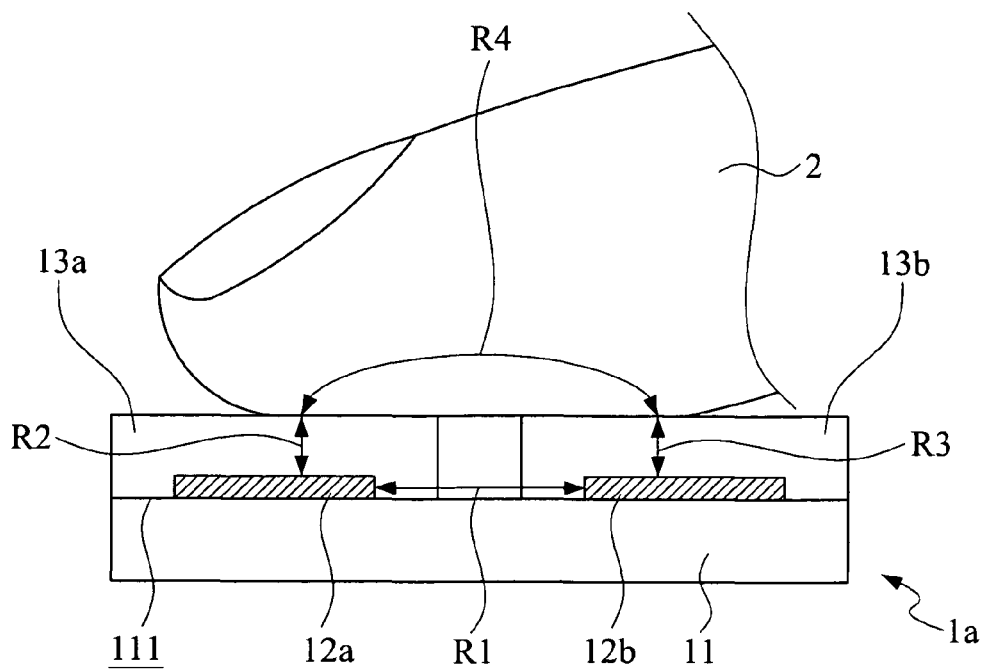
FIG. 5 is a schematic view illustrating a finger touching the ion-dielectric touch sensor in accordance with the second embodiment of the present invention.

Referring to FIGS. 4 and 5, FIG. 4 shows a schematic view of a second embodiment in accordance with the present invention and FIG. 5 is a schematic view illustrating a finger touching the ion-dielectric touch sensor in accordance with the second embodiment of the present invention. The second embodiment of the present invention provides an ion-dielectric touch sensor, generally designated at 1a, which shows a structure substantially similar to that of the first embodiment. Thus, for consistency and correspondence, the same reference numerals will be used to denote the same parts/components/devices. A difference between the first and second embodiments resides in that the second embodiment comprises a first dielectric layer 13a and a second dielectric layer 13b, which take the place of the dielectric layer 13 of the ion-dielectric touch sensor 1 of the first embodiment, and respectively enclose the first electrode 12a and the second electrode 12b. The structural arrangement and the way of assembling of the ion-dielectric touch sensor 1a of the second embodiment and the effect of the touching object 2 touching the ion-dielectric touch sensor 1a are identical to those of the ion-dielectric touch sensor 1 of the first embodiment, so that repeated description is not needed herein.

Figure 6:
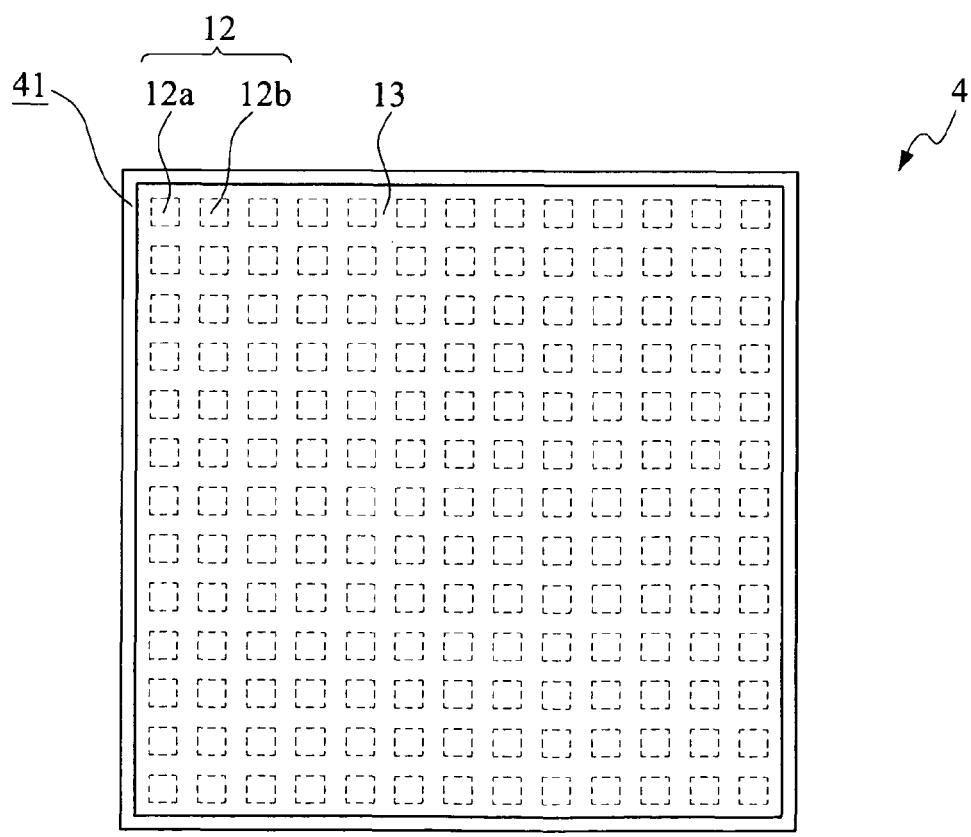
FIG. 6 shows a schematic view of a third embodiment in accordance with the present invention.

Referring to FIG. 6, which shows a schematic view of a third embodiment in accordance with the present invention, the third embodiment of the present invention provides an electronic device 4 in which the ion-dielectric touch sensor 1 of the present invention is embedded. Examples of the electronic device 4 include a touch panel, a water droplet sensor, a raindrop sensor, and a water level detector, but are not limited thereto. The electronic device 4 comprises an electrode mounting surface 41 and the ion-dielectric touch sensor 1 comprises an electrode array 12 and a dielectric layer 13. The array 12 is composed of a plurality of first electrodes 12a and second electrodes 12b that are arranged in an alternating manner. The electrode array 12 is arranged on the electrode mounting surface 41 of the electronic device 4. The dielectric layer 13 is laid on the electrode mounting surface 41 and encloses the first electrodes 12a and the second electrodes 12b. It is noted that the example of electronic device just described is only an example of a device to which the ion-dielectric touch sensor 1 of the present invention is applicable, and it is further noted that whatever devices that satisfy the features of the present invention are considered within the scope of protection of the present invention. Those having ordinary skills in the art may adopt whatever device that meets the features of the present invention to achieve this object. And, there is no need for further discussion of this.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An ion-dielectric touch sensor adapted to detect a touching operation applied by a touching object to the ion-dielectric touch sensor, the ion-dielectric touch sensor comprising:
    a base board, which has an electrode mounting surface;
    a first electrode, which is arranged on the electrode mounting surface;
    a second electrode, which is arranged on the electrode mounting surface at a location close to the first electrode; and
    a dielectric layer, which contains at least one polymer electrolyte and is coated on the electrode mounting surface of the base board to enclose the first electrode and the second electrode to form an electrical resistance between the first and second electrodes;
    wherein when the touching object touches the dielectric layer of the ion-dielectric touch sensor, the electrical resistance between the first and second electrodes changes a value thereof, which is detectable by a detection circuit connected between the first and second electrodes.

2. The ion-dielectric touch sensor as claimed in claim 1, wherein the dielectric layer comprises organic polymer and wherein the dielectric layer is formed of a mixture of the organic polymer and the polymer electrolyte.

3. The ion-dielectric touch sensor as claimed in claim 1, wherein the dielectric material comprises silicon polymer and wherein the dielectric layer is formed of a mixture of the silicon polymer and the polymer electrolyte.

4. The ion-dielectric touch sensor as claimed in claim 1, wherein the dielectric layer comprises a co-polymer formed of polymerization of a plurality of monomers and wherein the dielectric layer is formed of the co-polymer.

5. The ion-dielectric touch sensor as claimed in claim 1, wherein the dielectric layer comprises an adhesive material and wherein the dielectric layer is formed of a mixture of the adhesive material and the polymer electrolyte.

6. The ion-dielectric touch sensor as claimed in claim 1, wherein the dielectric layer comprises a first dielectric layer and a second dielectric layer, which respectively enclose the first and second electrodes.

7. An electronic device comprising an ion-dielectric touch sensor, the electronic device comprising:
    an electronic device, which has an electrode mounting surface;
    an ion-dielectric touch sensor, which comprises:
    an array of electrodes, which comprises a plurality of first electrodes and second electrodes that are arranged in an alternating manner, the array being arranged on the electrode mounting surface;
    a dielectric layer, which contains at least one polymer electrolyte and is coated on the electrode mounting surface to enclose the first electrodes and the second electrodes to form an electrical resistance between the first and second electrodes of the array;
    wherein when a touching object touches the dielectric layer of the ion-dielectric touch sensor, the electrical resistance between the first and second electrodes changes a value thereof, which is detectable by a detection circuit connected between the first and second electrodes.

* * * * *